(12) United States Patent
Cherubini et al.

(10) Patent No.: US 9,251,828 B2
(45) Date of Patent: Feb. 2, 2016

(54) SERVO CONTROL

(75) Inventors: Giovanni Cherubini, Rueschlikon (CH); Jens Jelitto, Rueschlikon (CH); Mark A. Lantz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/241,931

(22) PCT Filed: Jul. 4, 2012

(86) PCT No.: PCT/IB2012/053392
§ 371 (c)(1),
(2), (4) Date: Feb. 28, 2014

(87) PCT Pub. No.: WO2013/046067
PCT Pub. Date: Apr. 4, 2013

(65) Prior Publication Data
US 2014/0204483 A1    Jul. 24, 2014

(30) Foreign Application Priority Data
Sep. 29, 2011  (EP) ..................................... 11183343

(51) Int. Cl.
*G11B 5/588*     (2006.01)
*G11B 5/008*     (2006.01)
*G11B 5/48*      (2006.01)
*G11B 5/584*     (2006.01)

(52) U.S. Cl.
CPC ................ *G11B 5/588* (2013.01); *G11B 5/008* (2013.01); *G11B 5/00847* (2013.01); *G11B 5/4893* (2013.01); *G11B 5/584* (2013.01)

(58) Field of Classification Search
CPC ...... G11B 5/008; G11B 5/4893; G11B 5/584; G11B 5/5526; G11B 5/59688; G11B 5/00847; G11B 5/588

USPC ................ 360/75, 55, 72.3, 78.02, 83, 251.1, 360/261.1, 290, 77.05, 78.14

See application file for complete search history.

(56) References Cited

U.S. PATENT DOCUMENTS 6,430,008 B1 *  8/2002  Trabert .................. G11B 5/584
                                                       360/317
6,754,026 B1 *  6/2004  Koski ..................... G11B 5/584
                                                       360/73.04

(Continued)

FOREIGN PATENT DOCUMENTS

EP        0069548 A1      1/1983
EP        1840878 A2     10/2007
WO     2010044785 A1      4/2010

OTHER PUBLICATIONS

PCT International Search Report and Written Opinion; International Application No. PCT/IB2012/053392; International Filing Date: Jul. 4, 2012; Date of Mailing: Oct. 9, 2012; pp. 1-8.

*Primary Examiner* — Thomas Alunkal
(74) *Attorney, Agent, or Firm* — Cantor Colburn LLP

(57) ABSTRACT

In a method for operating a tape storage system, while a tape is being moved in a tape drive across a tape head for one or more of reading and writing user data from/to a data track of the tape, a read element of the tape head, which read element is assigned to the data track, is moved transverse to a moving direction of the tape for a distance of more than a width of the data track. A transverse position of one or more of the following elements is subject to a signal supplied by the read element during its transverse move: The read element; another read element assigned to the data track; and a write element assigned to the data track.

19 Claims, 8 Drawing Sheets

(56) References Cited

U.S. PATENT DOCUMENTS

| | | | | |
|---|---|---|---|---|
| 7,116,514 B2* | 10/2006 | Mahnad | G11B 5/00 360/77.12 |
| 7,826,169 B2* | 11/2010 | Saliba | G11B 5/584 360/48 |
| 2008/0158720 A1* | 7/2008 | Watson | G11B 5/00826 360/77.12 |
| 2009/0161249 A1* | 6/2009 | Takayama | G11B 5/584 360/77.12 |
| 2010/0079905 A1* | 4/2010 | Fasen | G11B 5/584 360/77.12 |
| 2010/0302677 A1* | 12/2010 | Bates | G11B 5/584 360/77.12 |
| 2011/0013312 A1* | 1/2011 | Bui | G11B 5/5552 360/77.05 |
| 2011/0199702 A1* | 8/2011 | Hoerger | G11B 5/584 360/77.12 |

* cited by examiner

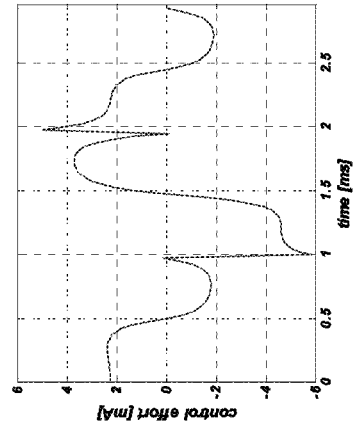
FIG. 3 b)
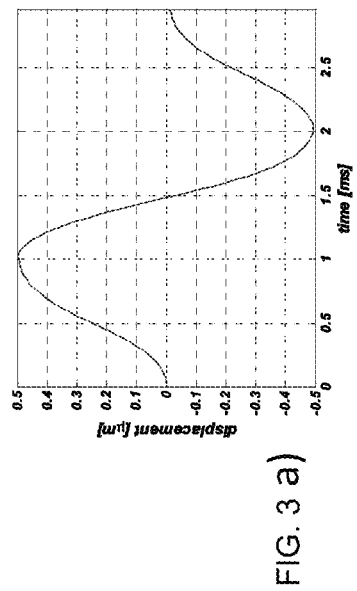
FIG. 3 a)
FIG. 3
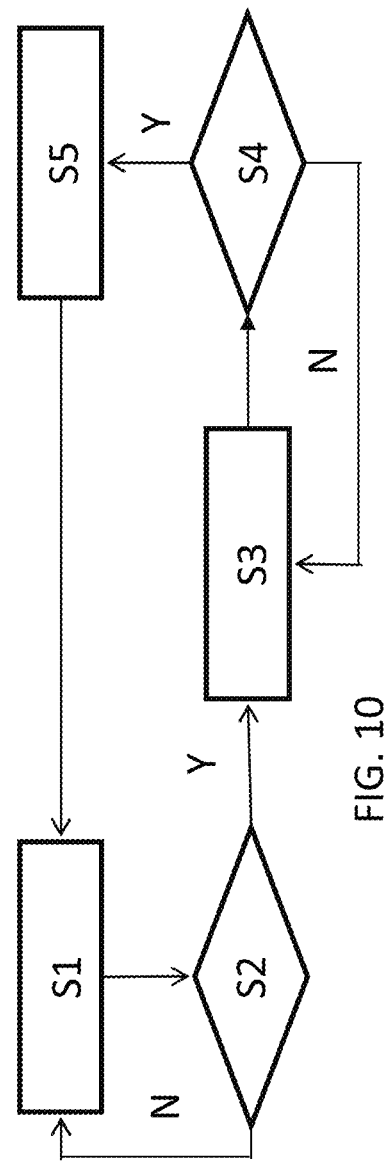
FIG. 10

SERVO CONTROL

PRIORITY

This is a U.S. national stage of application No. PCT/IB2012/053392, filed on Jul. 4, 2012. Priority under 35 U.S.C. §119(a) and 35 U.S.C. §365(b) is claimed from European Patent Application No. 11183343.0, filed Sep. 29, 2011, and all the benefits accruing therefrom under 35 U.S.C. §119, the contents of which in its entirety are herein incorporated by reference.

FIELD OF THE INVENTION

The present invention relates to a method for operating a tape storage system, and to a tape storage system.

BACKGROUND

Servomechanisms in tape drives include several components, which are mechanical parts, transducers, and signal-processing units that are realized by logical circuits. For example, in a track-follow servomechanism for state-of-the-art tape drives, a coarse actuator and a fine actuator may be used for the lateral positioning of a rigid tape head module containing data write and read elements as well as servo read elements, also known as servo elements. In addition, a skew actuator might tilt the tape head module to align the tape head module with the tape for write/read operations. One or multiple servo elements that are part of the tape head module provide servo signals to respective servo channels for computing estimates of tape velocity and longitudinal tape position as well as a lateral tape head position, also known as transverse position, with respect to the tape, and a controller determines digital control signals for actuators such as an actuator for moving the tape head module as a whole in a lateral dimension. With an increase in track density that is envisaged for future tape drives, controlling only the lateral position of a rigid tape head module and potentially its skew, whereby the distances between the servo elements and the individual read/write elements are fixed, might not be sufficient to ensure adequate individual positioning accuracy of the read elements that move along data tracks. In state-of-the-art tape drives, environmental conditions may lead to tape expansion or tape contraction that may reduce the positioning accuracy and eventually limit the achievable track density. Furthermore, low-frequency processes such as tape tension fluctuations and residual dynamic tape skew of the tape head with respect to the tape also contribute to the reduction of positioning accuracy of the individual read elements.

BRIEF SUMMARY OF THE INVENTION

According to an embodiment of one aspect of the invention, a method is provided for operating a tape storage system. While a tape is being moved in a tape drive across a tape head for one or more of reading and writing user data from/to a data track of the tape a read element of the tape head, which read element is assigned to the data track, is moved transverse to a moving direction of the tape for a distance of not less than a width of the data track. A transverse position of one or more of the following elements is controlled subject to a signal supplied by the read element during its transverse move:
 the read element,
 another read element assigned to the data track, and
 a write element assigned to the data track.

In embodiments, the method may comprise one or more of the following features:
 the read element is moved during a first period in time; and the transverse position of the one or more elements is controlled at the end or after the first period in time subject to the signal supplied by the read element during the first period in time;
 controlling the transverse position of the one or more elements includes positioning the subject element on a track center line of the assigned data track;
 controlling the transverse position of the one or more elements includes determining a transverse deviation of the subject element from the track center line of the assigned data track;
 the read element is moved transverse to the moving direction of the tape for scanning a servo pattern written to the data track, which servo pattern is followed on the data track by a user data section containing or reserved to contain user data;
 in a servo pattern scan mode the read element is moved for scanning the servo pattern; in a user data read/write mode the user data section is read or written respectively by means of the one or more elements; and the servo pattern scan mode and the user data read/write mode alternate during moving the tape across the tape head;
 the one or more elements are positioned on a track center line of the assigned data track;
 the tape is preformatted with the servo pattern prior to the tape being used for reading or writing data from/to;
 the servo pattern is represented by preformatted data items including preformatted data items in synchronization fields;
 the servo pattern is written by the write element in combination with writing user data to the tape;
 the read element is moved for scanning the servo pattern of the assigned data track and for at least partially scanning a servo pattern of one or both of adjacent data tracks;
 the servo pattern of the one or both adjacent data tracks is phase shifted with respect to the servo pattern of the assigned data track;
 the servo pattern of the assigned data track comprises servo data sub-patterns which repeat in the servo pattern in longitudinal direction at a first frequency; and the servo patterns of the one or both adjacent data tracks comprises the same servo data sub-patterns which repeat in said adjacent data track at a second frequency being different from the first frequency;
 the read element is moved transverse to the moving direction of the tape for a distance of twice the width of the data track;
 the read element is oscillating transverse to the moving direction of the tape;
 the read element starts moving in response to identifying a longitudinal position on the tape, which longitudinal position indicates a beginning of the servo pattern.

According to an embodiment of another aspect of the invention, a computer program product is provided comprising a computer readable medium having computer readable program code embodied therewith, the computer readable program code comprising computer readable program code configured to perform a method according to any one of the preceding claims.

According to an embodiment of a further aspect of the invention, a tape storage system is provided. The tape storage system comprises a tape head and a tape drive for moving a tape inserted into the tape drive across the tape head. The tape head comprises a read element which read element is movably mounted for taking different positions transverse to a moving direction of the tape.

A controller is adapted to move the read element transverse to the moving direction of the tape for a distance of not less than a width of a data track assigned to the read element. The controller further is adapted to generate a control signal for controlling a transverse position of one or more of
  the read element,
  another read element assigned to the data track, and
  a write element assigned to the data track, subject to a signal supplied by the read element during its transverse move.

In embodiments, the tape storage system may comprise one or more of the following features:
  the one or more elements are movably mounted at a frame of the tape head for taking different transverse positions with respect to the frame;
  the tape head comprises a set of read elements assigned to different data tracks; the tape head comprises an assembly containing a subset out of a set of read elements, which read elements of the subset of read elements are mechanically linked; and the assembly is movably mounted for taking different positions transverse to a moving direction of the tape;
  the tape head comprises an assembly containing the read element and the write element being mechanically linked together; the assembly is movably mounted for taking different positions transverse to the moving direction of the tape; the controller is adapted to move the assembly transverse to the moving direction of the tape for a distance of not less than a width of the data track during the tape being moved; and the controller is adapted to generate the control signal for controlling a transverse position of the assembly;
  the tape head comprises an assembly containing the other read element and the write element being mechanically linked together; the assembly is movably mounted for taking different positions transverse to a moving direction of the tape; and the controller is adapted to generate a control signal for controlling a transverse position of the assembly;
  the read element, the other read element and the write element are individually movable for taking different positions transverse to a moving direction of the tape; and the controller is adapted to generate a control signal for controlling a transverse position of the other read element and the write element;
  the read element and the write element are individually movable for taking different positions transverse to a moving direction of the tape; and the controller is adapted to generate a control signal for controlling a transverse position of the read element and the write element.
  the movably mounting of the read element includes an actuator for moving the read element and a restoring force element.

It is understood that method steps may be executed in a different order than listed in a method claim. Such different order shall also be included in the scope of such claim as is the order of steps as presently listed.

Embodiments described in relation to the aspect of an apparatus shall also be considered as embodiments disclosed in connection with any of the other categories such as the method, the computer program product, etc.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

FIG. 3A and FIG. 3B, in two diagrams a) illustrative trajectory describing the motion of an individual read element across the tape and b) illustrative control effort for the individual read element, as used in an embodiment of the present invention;

FIG. 10 is a flow chart of a method for operating a tape storage system according to an embodiment of the present invention.

DETAILED DESCRIPTION OF THE EMBODIMENTS

Figure 1:
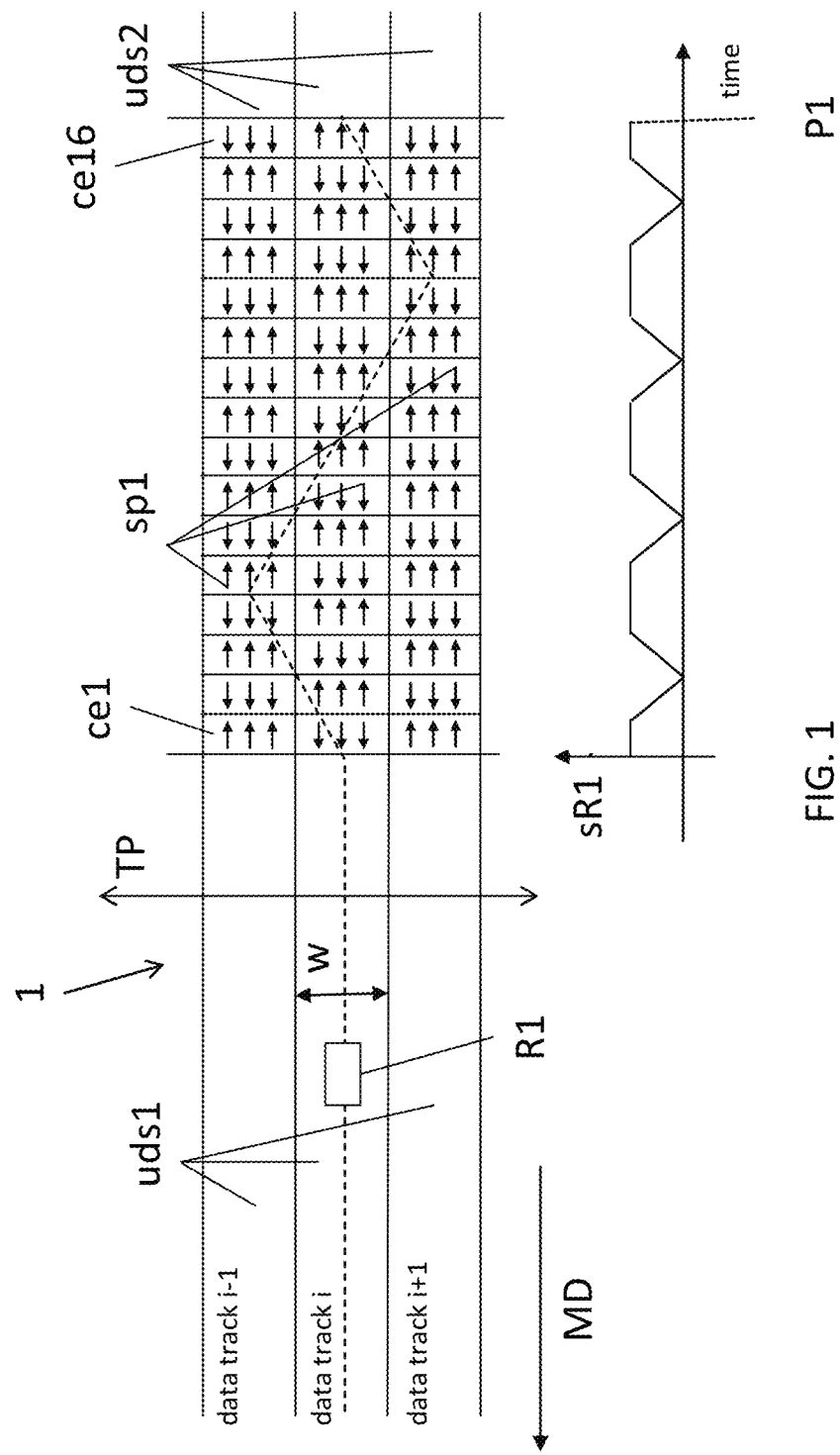
FIG. 1 is a section of a tape in top view and an illustrative movement of a read element across the tape, as part of a method according to an embodiment of the present invention.

As an introduction to the following description, it is first pointed at a general aspect of the invention, concerning a way for positioning a read and/or write element of a tape head of a tape storage system preferably on a track centerline of a data track for improving read and write results respectively. The present idea includes a read element of the tape head which read element is moved transverse to a moving direction of the tape while the tape is being moved across the tape head. Given, that a tape when being moved by driving its reel/s is moved in a longitudinal direction for reading and/or writing user data from/to one or more longitudinal data tracks typically extending in parallel on the tape, such read element is moved transverse to such longitudinal direction, or in other words cross or lateral the subject data track.

Typically, a tape is organized into multiple data tracks in parallel to each other. The data tracks may all have the same width, i.e., the same extension in lateral dimension. A tape head may comprise multiple read and/or write elements wherein each read and/or write element during a read and/or write operation typically is assigned to one of the data tracks to read and/or write data from/to. When considering a read mode for example, the multiple read elements may simultaneously read data from the respective assigned data tracks while the tape is moved across the tape head. Typically, the number of data tracks on the tape exceeds the number of read elements available at the tape head. Hence, at a given longitudinal position of the tape, for example, at the end of the tape, the tape drive may reverse its moving direction preferably by reversing the direction the reel/s are driven, and the tape head including all the read elements being mechanically linked to each other may be laterally offset from the present position, preferably by the width of at least one data track, so that all data tracks may be read by letting the tape head move across the tape in a serpentine fashion. In this context, a wrap is defined as a set of tracks written or read at the same time. The set of wraps that is written or read between two adjacent servo bands, while moving the tape across the head in such a serpentine fashion, determines what is usually referred to as a data band. Servo and data bands typically span a region that extends over the entire length of the tape.

Although such read element being at least temporarily assigned to a data track, the lateral position of the read element may not exactly be centered on a track centerline of the assigned data track. Of course, the same holds for an assigned write element or an assembly of a read and a write element being linked mechanically. Any such deviation from a track centerline during reading and writing, i.e. any misalignment of a read and/or write element with respect to an assigned data track, may result in failing of reading the correct data, or may result in partially writing data to adjacent data tracks. Known tape storage systems provide means in the form of a servo mechanism for controlling a lateral position of the entire tape head. In such tape head the various read and write elements are mechanically coupled with each other in a fixed, non-alterable distance from each other. Still, individual read and/or write elements may deviate from their data track centerlines for various reasons explained above.

Hence, it was found that making one or more of a read and a write element individually movable—and preferably movable with respect to the tape head, and in particular movable with respect to a frame of the tape head—may be beneficial in improving positioning individual elements or assemblies of elements. For doing so, it is preferred to include a servo pattern into a data track of the tape. In conventional tape storage systems, a data track may only hold or be reserved to hold user data, i.e. data being received from a host while servo patterns were exclusively written to dedicated servo tracks at the edges of the data bands during tape manufacturing, which servo tracks are read by means of dedicated servo readers exclusively installed for reading such servo patterns from the dedicated servo tracks.

According to an embodiment of the present invention, a servo pattern included in a data track may cover a short section of the data track, and may repeat along the data track for multiple times. Between two servo patterns in a data track, a section is provided for containing or being reserved to contain user data. Preferably, user data sections alternate with servo patterns in a data track of the tape. Preferably, a unique servo pattern may be used to repeatedly intersperse with the data track. However, in another embodiment, different servo patterns may be used at different locations of a data track. Typically, a servo pattern may occur about every 2 meters in a data track of the tape. In this respect, the servo patterns are not meant to claim a lot of storage space of a data track.

It is preferred, that in each data track of a set of data tracks that is assigned to a single read element the servo patterns extend along the same longitudinal positions. In other words, data bands containing such data tracks may be characterized by lateral stripes containing servo patterns.

When moving a read element assigned to a data track transverse to the moving direction of the tape for equal to or more than a width of the data track, the read element may irrespective from its starting position on the data track cross the border to at least one of its adjacent data tracks on purpose and will read the servo pattern from such adjacent data track at least temporarily. If the servo pattern written to the adjacent data track at such longitudinal position is at least somehow distinguishable from the servo pattern of the assigned/present data track, any such transition between adjacent data tracks may be detected from the signal of the read element according to an embodiment of the present invention.

Hence, the read element may on purpose be controlled to laterally move during a first period in time, which first period in time specifically is the time needed to scan the servo pattern. During such time, the read element is moved transverse in order to provoke scanning transitions between servo patterns of adjacent data tracks. Such mode is also denoted as servo pattern scan mode. In a preferred embodiment, the read element is moved transverse twice the width of the data track in order to pass transitions between the present data track and both of the adjacent data tracks, i.e. the data track above and the data track below. Such motion provides additional lateral positioning information of the read element relative to the data track. In another preferred embodiment, the read element is oscillating transverse to the moving direction of the tape. This embodiment again provides additional lateral positioning information of the read element relative to the data track, and delivers a periodic signal suited for allowing time averages to be built etc.

Preferably, the transverse movement of the read element is started when a longitudinal position of the tape is reached indicating the beginning of a servo pattern in the moving direction of the tape. Such longitudinal position may be derived from some coding which may be identified by a servo reader element, for example. However, other mechanisms may trigger a transverse movement of the read element. For example, a defined code/pattern in the data track may indicate the start of a servo pattern, or the beginning of the servo pattern itself may be identified by the read element. At the end of a servo pattern, the transverse moving of the read element may be terminated, subject to a trigger similar to the trigger described above with respect to the beginning of the servo pattern.

In other embodiments, the read element may permanently move transverse. However, this only is an option when the read element is not additionally used for reading user data from the data track. In such scenario, the read element may continue to oscillate even if currently no servo pattern but a user data section is scanned. However, even then it may be preferred to stop moving the read element and restart the motion for scanning the next servo pattern.

A signal supplied by the read element during its transverse move—which signal is also denoted as read-back signal—is used for positioning one or more of the read element executing the transverse movement itself, another read element assigned for reading data from the data track, and a write element assigned for writing data to the data track.

In a preferred embodiment, a deviation of the subject element—for example, said read element—from the track centerline of the data track in an idle position of the said element is determined during or after the transverse move of the read element. The subject element is controlled to be set on the track centerline either during or after the complete servo pattern is scanned by the assigned read element. In another embodiment, a small gap may be provided on the data track between the servo pattern and the subsequent user data section for allowing sufficient time for such determination and such positioning action.

It is noted that tape heads with different configurations of elements may be used for implementing the present idea. Fewer or more than three elements may be found in the tape head. The existence of elements depends on the configuration of the tape head and the underlying tape specification. Therefore, in one embodiment the read element used for moving transverse for scanning the servo patterns may also be used for reading user data from the data track. Hence no other read element is provided and assigned to the same data track. In such scenario, the read element may need to be positioned preferably on a track centerline of the data track at latest when the next user data section is reached in order to be ready for reading user data therefrom. In such configuration, the single read element is preferably used for scanning servo patterns and for reading user data of the same data track. In such scenario, the read element is positioned based on the information in its read-back signal during the servo pattern scan mode. In a preferred embodiment, a write element is additionally provided. A transverse positioning of the write element may also be controlled based on the information delivered by the read element during the servo pattern scan mode. In such configuration, the read element and the write element may individually be controllable in their transverse positions. In an alternate embodiment, the read element and the write element may mechanically be coupled into an assembly wherein only the assembly as a whole may be moveable in a lateral dimension. In such configuration, it is implied that when the read elements detects a deviation from the track centerline, the write element is deviated by the same magnitude due to the mechanical linkage. In such embodiment, only a single actuator may be provided for enabling a transverse movement of both, the read and the write element in the common assembly. In the first scenario described above, two individual actuators and mountings may need to be provided, one for the read element and one for the write element.

In another basic configuration, the read element is dedicated for scanning servo patterns while another read element is dedicated for reading user data of the same data track. In such scenario, the other read element is positioned based on the information in the read-back signal of the read element supplied during the servo pattern scan mode. In a preferred embodiment, a write element is additionally provided. A transverse positioning of the write element may also be controlled based on the information delivered by the read element during the servo pattern scan mode. In such configuration, the read element, the other read element and the write element may individually be controllable in their transverse positions. In an alternate embodiment, the other read element and the write element may mechanically be coupled into an assembly wherein only the assembly as a whole may be moveable in a lateral dimension. In a further embodiment, the read element, the other read element and the write element may mechanically be coupled into an assembly wherein only the assembly as a whole may be moveable in a lateral dimension.

Basically, there are two ways of writing the servo patterns to the tape. In a first embodiment, the tape is preformatted, preferably during tape manufacturing, with the servo pattern prior to the tape being used for reading or writing data from/to. In another variant of this embodiment, preexisting data fields in a data track may be used as servo patterns instead of dedicated servo patterns. Such data fields may include, for example, synchronization fields, in general, and Data Set Separator (DSS) fields and/or Variable-Frequency Oscillator (VFO) fields in particular. In another embodiment, the servo pattern is written to the tape by the write element in the head during tape drive operation. In such scenario, every time user data is written to a data track, a servo pattern is periodically written within the data track at dedicated longitudinal positions. The servo patterns are written by the write element that is also used for writing user data into user data sections. After a write element having written a servo pattern, it is continued to be used for writing user data. Preferably, in such a scenario a single write element performs both operations, writing the servo pattern and writing the user data in an alternating manner.

Since it is desired to move the read element transverse into at least one of the adjacent data tracks, the servo pattern in the adjacent data track is preferred to exhibit different servo pattern characteristics in order to allow identifying a transition between data tracks. Hence, in one embodiment of the present invention, the servo pattern in the adjacent data track is phase shifted with respect to the servo pattern of the data track the read element presently is assigned to. More generally, this includes that the servo pattern of the adjacent data track at a given longitudinal position, and preferably at any longitudinal position of the servo pattern, is distinguishable from the servo pattern of the present data track. In a tape storage medium, data and servo patterns are typically stored in form of magnetic orientations of small regions on the tape. Specifically, a phase of such magnetic orientation of a servo pattern in the present data track is shifted with respect to the magnetic orientation of a servo pattern in an adjacent data track.

In another embodiment, the servo pattern of the assigned data track comprises servo data sub-patterns which repeat within the servo pattern in longitudinal direction at a first frequency. The servo patterns of one or both of the adjacent data tracks comprises the same servo data sub-patterns which, however, repeat in said adjacent data track at a second frequency being different from the first frequency. Given, that the frequencies are known a priori, the read-back signal obtained from a read element moving in the lateral direction may allow for deriving the lateral position information needed.

It is preferred, that a tape head extending laterally across the entire width of the tape may include a frame holding the various read and/or write elements. It is preferred, that the read and write elements are transverse movably mounted in the frame of the tape head and may laterally move with respect to the tape head and its frame. Subject to the configuration, groups of elements may be mechanically coupled and be movable only in common. The actuator and any suspension if needed may be arranged or mounted at/to the tape head/frame.

In a preferred embodiment, each read element/write element combination assigned to a common data track is controllable based on the signal of a read element assigned to the same data track. The read element scanning the servo pattern may, as illustrated above, be either additionally used for reading user data or may be a different read element. However, there may be embodiments, in which a read element assigned for scanning servo patterns of a different data track may be used for controlling the position of the read/write elements assigned to the present data track. In such embodiment, it may be preferred, that a group of neighboring read and/or write elements are combined and preferably are mechanically linked into an assembly, and only a single read element, which may, for example, be a separate read element assigned to one of the data tracks is used to control the transverse position of the entire assembly. In such embodiment, the complexity for servo pattern scanning read elements is reduced at the cost of not every single read and write element being individually controllable in its transverse position.

The present idea promotes the capability of individual lateral positioning of read and/or write elements in tape drives. The current transverse reader element position is identified through a relative motion of a reader element assigned to the data track across the present data track and one or more track edges with respect to adjacent data tracks in an area where self-written or preformatted servo patterns are recorded. A tape head module with actuators individual to the one or more read elements is introduced. The position of the individual read elements with respect to the individual data tracks can be determined by reading short servo patterns also denoted as "servo bursts" by the individual read element at a constant frequency. The servo bursts are embedded in the data tracks at preferably equally spaced intervals. Adjacent servo bursts on even and odd data tracks—wherein out of two adjacent data tracks one is the even data track while the other one is the odd data track—are preferably characterized by having the same frequency but a 180 degree phase shift relative to each other. By moving a read element laterally up and down across the servo bursts by an amount that is equal to or more than the data track width, the amplitude of the read-back signal of such read element can be used to derive a position error signal for the individual data track. In another embodiment, which may be preferable in case of difficult alignment of the servo bursts across adjacent data tracks because of, e.g., tape velocity deviation from the nominal value during the servo writing process, the frequency of the signal read-back from the servo bursts may preferably alternate on even and odd tracks. The position error signal would then be preferably derived from the observation of the spectral components of the read-back signal at the two frequencies corresponding to the servo bursts. If for a particular application it is undesirable to embed additional servo bursts into the data tracks, existing synchronization patterns in the data tracks may be used. The servo bursts can preferably be written by using the write elements during a self-servo writing process interleaved with normal user data writing in a closed-loop track-follow operation. Assuming the data bands are straddled by preformatted servo tracks and wraps are written in a serpentine manner as for example specified in the LTO (Linear Tape Open) standard, the first wrap in each tape motion direction would be a reference wrap, i.e. it would be written using only the servo information that is provided by pre-written servo pattern in the servo tracks, and possibly servo information pre-written over a short initial segment of tape. The following wraps would then be written by exploiting also the servo information contained in the previously written servo bursts. To avoid the loss in efficiency that would be incurred by alternating write and read operations using write/read elements from the same tape head module, reading of the previously written servo bursts may be performed by using the reading elements on a parallel tape head module properly actuated in the off-track direction to guarantee that a useful servo signal is obtained while reading the servo bursts.

The location where the servo bursts preferably are written to on the data track can accurately be determined for example by referring to longitudinal position (LPOS) information embedded in the pre-written servo pattern in the servo tracks, and aligning the servo bursts to the end of LPOS frames identified by the last bit in an LPOS word. The position error signals are used to derive control signals for the individual actuators, which are then fed to individual servomechanisms to maintain the read/write elements on the data track. Alternatively, the individual position error signals could be used to derive control signals for an optimum alignment of one rigid head module across all data tracks by optimal joint lateral positioning and head tilting. In a further embodiment, the individual position error signals could be used to derive control signals for an optimum alignment of a number of sections of the head module, each containing a subset of the read elements and having a lateral position that is independently controllable. Short Gray-coded postambles can be periodically appended to the servo bursts to guarantee a unique assignment of each reader to the data tracks. The tape head module with individual reader element actuation may be equipped with piezoelectric actuators, thermal actuators, or actuators using electrostatic force to provide the required precise positioning capability to each read element.

A positioning accuracy for positioning an element with respect to a data track can be determined by a so-called read margin, which is defined as a minimum of distances between the top or bottom edge of a read element and the top or bottom edge of the data track being read, respectively. If the read margin becomes negative, the read element is partly positioned over the adjacent data track. Hence, the read element starts picking up signal contributions from an adjacent data track, which appears as an interference signal superimposed to the desired data signal, thus reducing the signal-to-noise ratio and consequently the reliability of the read process. In state-of-the-art tape drives, environmental conditions lead to tape expansion or tape contraction that may reduce read margins and eventually limit the achievable track density. Furthermore, low-frequency processes such as tape tension fluctuations and residual dynamic tape skew of the tape head with respect to the tape also contribute to the reduction of read margins of the individual read elements.

In the figures, same or similar elements are denoted by the same reference signs.

FIG. 1 shows a section of a tape 1 in top view and an illustrative movement of a read element R1 across the tape 1, as part of a method according to an embodiment of the present invention. The tape 1 is meant to be moved across a tape head presently not shown in its entirety in moving direction MD as is indicated by arrow MD. The section of the tape 1 as presently shown in FIG. 1 comprises three longitudinal data tracks i, i−1, i+1 in parallel to each other. Of course, the tape 1 is meant to comprise many more data tracks which are not shown in FIG. 1. A dimension transverse to the moving direction MD, i.e. also transverse to the longitudinal extension of the data tracks is denoted by arrow TP.

The data tracks i, i−1, i+1 are meant to write user data to and read user data from. In the present embodiment, each data track i, i−1, i+1 comprises user data sections uds and servo patterns sp alternating with the user data sections uds. In FIG. 1, a first user data track section uds1 is followed by a servo pattern sp1 and a second user data section uds2. This arrangement holds for all data tracks shown. In the present example, it is assumed that the servo pattern sp1 covers sixteen cells ce1 to ce16 in each data track i, i−1, i+1. Each cell ce may be coded by a magnetic orientation indicated by corresponding arrows in such cells ce. In the present example, the servo pattern sp1 of each data track i, i−1, i+1 comprises a cell by cell alternating magnetic orientation in moving direction MD shifted by 180 degrees. In addition, cells ce at the same longitudinal positions of adjacent data tracks comprise different magnetic orientations shifted by 180 degrees. By such arrangement of servo patterns sp1 in adjacent data tracks i, i−1, i+1 a transition between adjacent data tracks is identifiable.

Figure 8:
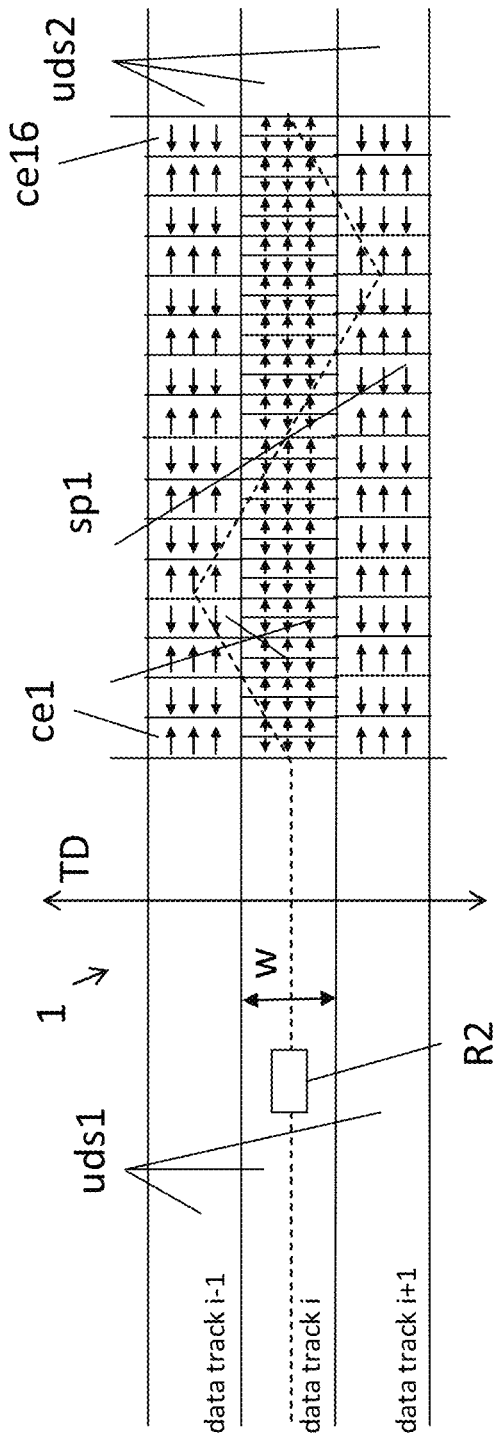
FIG. 8 is another section of a tape in top view and an illustrative movement of a read element across the tape, as part of a method according to an embodiment of the present invention.
Figure 8:
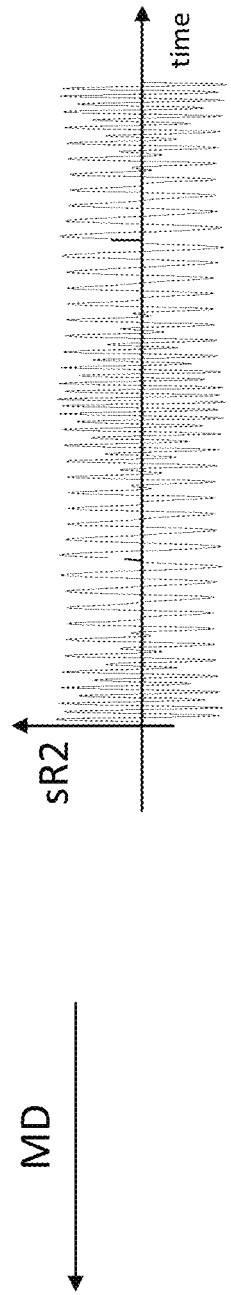

A different servo pattern design is illustrated in FIG. 8. The servo patterns sp1 of the different data tracks i, i−1, i+1 comprise a repetition of a common servo sub-pattern yielding read-back signals at different frequencies. While the magnetic orientations of cells ce1 and ce2 of the servo pattern sp1 of the data track i may define a servo sub-pattern, such servo sub-pattern is repeated at frequency f1 in the data track i. In the adjacent data tracks i+1 and i−1, the sub-pattern is repeated at a frequency f2 which frequency f2 is half the frequency of f1.

In FIG. 1, in data track i, a read element R1 is depicted which read element R1 currently is positioned in the first user data section uds1 on a centerline of the assigned data track i. Given that the tape 1 is moved at constant velocity in moving direction MD, the read element R1 continues to stay over the track centerline and possibly reads out user data from the first user data section uds1 of the data track i. Whenever the beginning of the servo pattern sp1 is detected by proper means, the read element R1 is deflected laterally, i.e. takes transverse positions TP deviated from the track centerline. In the present case, the read element R1 first is deflected towards the data track i−1 for a distance corresponding to a width w of the data tracks. Then, the read element R1 is moved back towards the data track i, and continues to move towards the data track i+1. This movement covers twice the width w of the data track in transverse direction. Afterwards, the read element R1 moves back again for a distance equal to the width w of a data track for finally resting on the centerline of the data track i. Any transverse movement of the read element R1 is then stopped. The read element R1 starts reading user data from the second user data section usd2 of the data track i, after being aligned with the identified center line of data track i. The entire movement of the read element R1 while passing the first user data section usd1, the servo pattern sp1 and the second user data section usd2 is illustrated by its trajectory shown as a dashed line across the data tracks.

An envelope of the read-back signal sR1 over time supplied by the read element R1 during its movement across the servo patterns sp1 in the data tracks is shown below the servo pattern sp1. It is assumed that the energy of such read-back signal is measured and provides the largest value when the read element is located within one of the data tracks, and a minimum value when the read element R1 is crossing borders between adjacent data tracks. Hence, by means of the coding of the servo patterns of adjacent data tracks and by laterally moving a read element presently assigned to the data track, any transition between two adjacent data tracks can be identified in the read-back signal of such read element by means of identifying minimum values in its read-back signal.

For the reason that in the present example, the read element R1 is centered prior to entering the servo pattern sp1, the minimum values in the read-back signal envelope sR1 occur at certain time instants which allow for identifying the read element R1 being positioned on its track centerline. The read element R1 as a result may restart from its idle position to read user data from the second user data section usd2 of data track i. In case the read element R1 already would have been deviated from its track centerline in the first user data section usd1, the read-back signal would have shown minimum values at different time instants. By means of evaluating the positions of the minimum values in such read-back signal an initial deviation from the track centerline may be determined and subject to such deviation a control signal can be issued to an actuator assigned to the read element R1 for positioning the read element R1 on its track centerline again.

Figure 2:
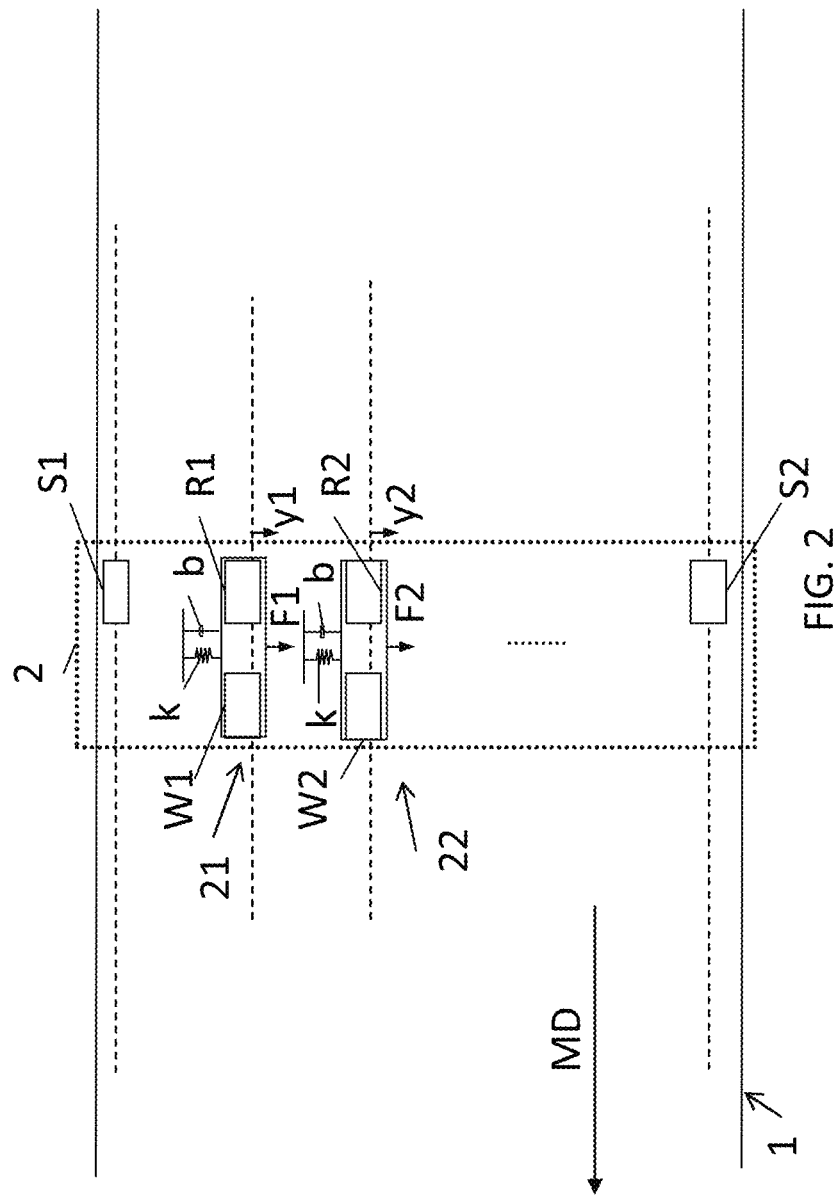
FIG. 2 is a first tape head of a tape drive system according to an embodiment of the present invention.

FIG. 2 illustrates a tape head 2 of a tape drive system according to an embodiment of the present invention. The tape head 2 is illustrated in top view and a tape 1 is moved across the tape head 2 in moving direction MD. At its upper and lower end, the tape head 2 comprises two servo elements S1 and S2 which are fixed to the tape head 2 and allow for reading servo information preformatted on the tracks on the tape 1 denoted as servo tracks. The dashed lines in this area denote reference positions of the servo tracks. Between the servo tracks, data tracks are arranged on the tape 1, which data tracks are not further shown in FIG. 2 for illustration purposes. For reading from and writing to such data tracks, there are symbolically illustrated two assemblies 21 and 22 of the tape head 2, wherein it is assumed that the first assembly 21 is assigned to a first data track and the second assembly 22 is assigned to a second data track below the first data track. Each assembly 21, 22 comprises a write element W1, W2, and a read element R1, R2. It is assumed that the write element W1 and the read element R1 as well as the write element W2 and the read element R2 are not laterally offset from each other but are arranged on a common line in moving direction MD of the tape 1 which line at best coincides with track centerlines of the corresponding data tracks. These data track centerlines are illustrated in FIG. 2 by a dashed line each. Note that a nonzero lateral offset may exist between the write element W2 and the read element R2, which may arise from manufacturing tolerances.

In addition, each assembly 21, 22 is equipped with an actuator b and a restoring force element k in form of a spring. The actuators b may for example be embodied as piezo actuators. Hence, the assembly 21 may be moved in a transverse direction y1 by the actuator b against the force of the restoration element k, wherein a resulting force F1 acting on the assembly 21 holds the assembly 21 in a defined lateral position in transverse direction y1. Hence, the assembly 21 is laterally movable with respect to the tape head 2. Actuators b and restoring force elements k are preferably arranged in/on the tape head 2.

In the present embodiment, the entire assembly 21 is moved in the transverse direction, preferably in an oscillating manner, when the tape head 2 passes over a servo pattern in the assigned data track. FIG. 3a) illustrates an oscillating, lateral displacement of such read element over time. The displacement to be achieved is FIG. 3a) spans a lateral range of ±0.5 μm, and a full oscillation in this range may be obtained in less than 3 ms. Such displacement may be achieved by a spring-mass-damper system as illustrated in FIG. 2 in which the following parameters may be considered: spring constant k=713 N/m, mass m=0.0027 Kg, damping coefficient b=1.14 Ns/m, transducer gain=2.75 N/A. In such spring-damper-mass system, the desired displacement may be achieved by a control effort smaller than 6 mA. Diagram 3b) illustrates the control effort in mA on the actuator b as shown in FIG. 2 for generating the desired displacement as shown in FIG. 3a).

Referring back to FIG. 2, in the servo pattern scan mode the write element W1 is not used for writing and moves in an oscillating way, too, due to the mechanical coupling with the read element R1. A deviation of the assembly 21 from the track centerline may be determined from the read-back signal of the associated read element R1 which read element oscillates when scanning a servo pattern. The assembly 21 may be repositioned on the track centerline by means of adjusting its actuator b to move the assembly 21 into the desired transverse position. When reaching a user data section following the servo pattern in the assigned data track the assembly 21 will no longer be exposed to the evoked transverse movements but rest in the desired position which preferably is the position on the track centerline. In such user data read/write mode user data can be written to the data track by means of the write element W1, and/or user data can be read by means of the read element R1.

In the present example, the second assembly 22 is meant to work in the same way the first assembly 21 does. Multiple additional assemblies may be provided in the tape head 2 not shown for illustration purposes.

Figure 5:
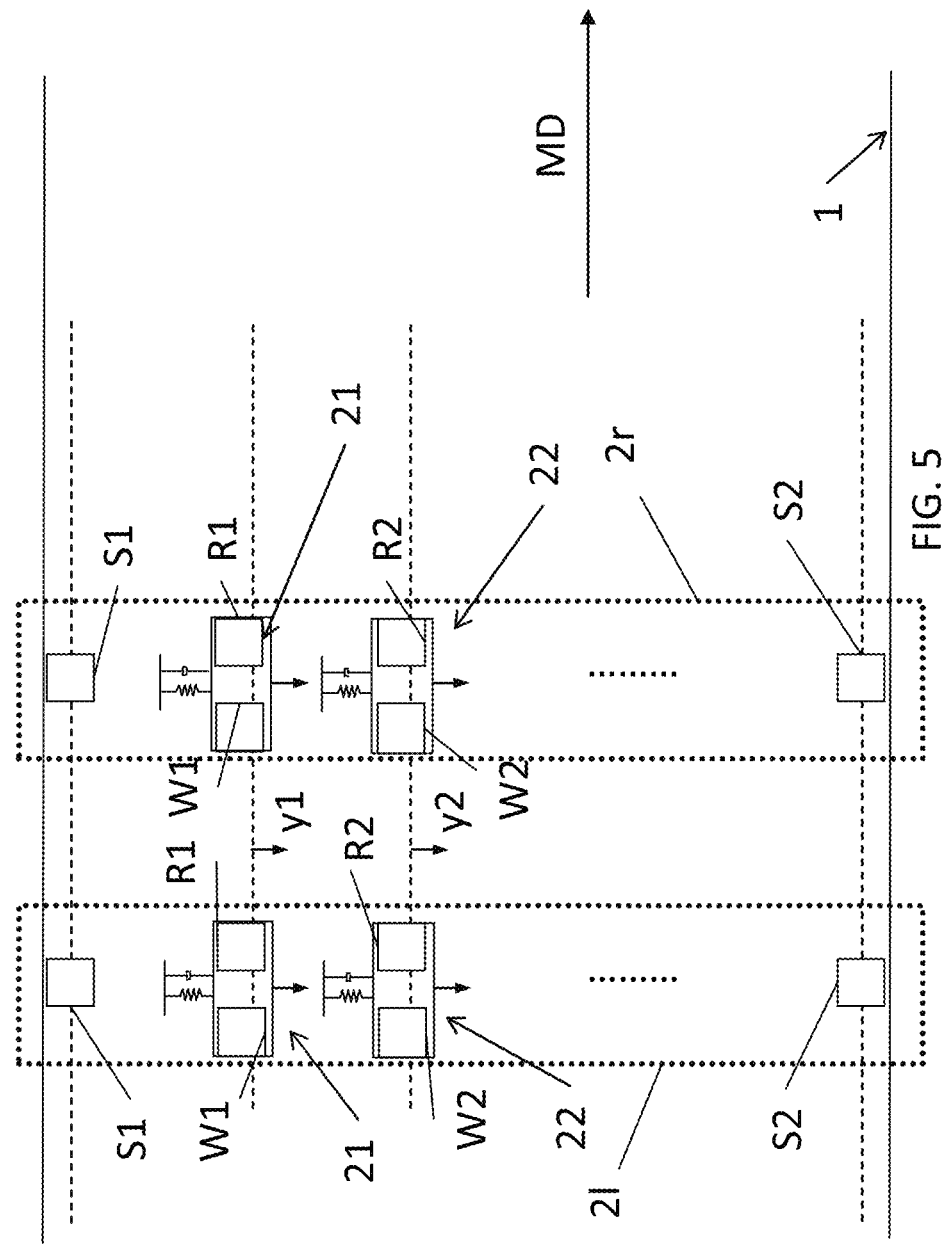
FIG. 5, FIG. 6 and FIG. 7 are tape heads of tape drive systems according to embodiments of the present invention.

FIG. 5 illustrates another tape head 2 in top view crossed by a tape 1. The tape head of FIG. 5 represents a duplication of the tape head of FIG. 2. The tape head 2 of FIG. 5 comprises a right tape head module 2r and a left tape head module 2l. Each tape head module 2l, 2r may comprise an individual frame to which the various read, write and servo elements are mounted. The tape head modules 2l, 2r may be individual tape head modules and may individually be replaceable, for example. Each tape head module 2l, 2r may comprise the same amount of assemblies with each assembly comprising a read element and a write element. For example, the first assembly 21 of each tape head module 2l, 2r comprises a write element W1 and a read element R1, while the second assembly 22 of each tape head module 2l, 2r comprises a write element W2 and a read element R2, and so on. Typically, all first assemblies 21 of the tape head modules 2l, 2r are assigned to the same data track, while all second assemblies 22 of the tape head modules 2l, 2r are assigned to another common data track, and so on.

Therefore, the tape head 2 of FIG. 5 is configured to allow read-after-write operations in which user data written to the tape 1 are immediately read by a read element R following the write element W in tape moving direction MD. This allows for an immediate verification of the data written to tape. In the present embodiment, for example, the write head W1 of the first assembly 21 of the left tape head module 2l may write user data to the tape 1 which user data immediately is read by the read element R1 of the first assembly 21 of the right tape head module 2r. Once the tape's moving direction MD reverses, the write element W1 of the first assembly 21 in the right tape head module 2r writes user data to the assigned data track and the read element R1 of the first assembly 21 of the left tape head module 2l immediately reads the written user data which written data are then verified in the controller of the tape drive with the user data received for writing to the tape 1.

While not each and every element of each tape head modules 2l, 2r may be used in operation, the present configuration of a tape head 2 may be beneficial in that identical tape head modules 2l, 2r may be used. This lowers efforts in the design and manufacturing of the tape head 2.

Figure 6:
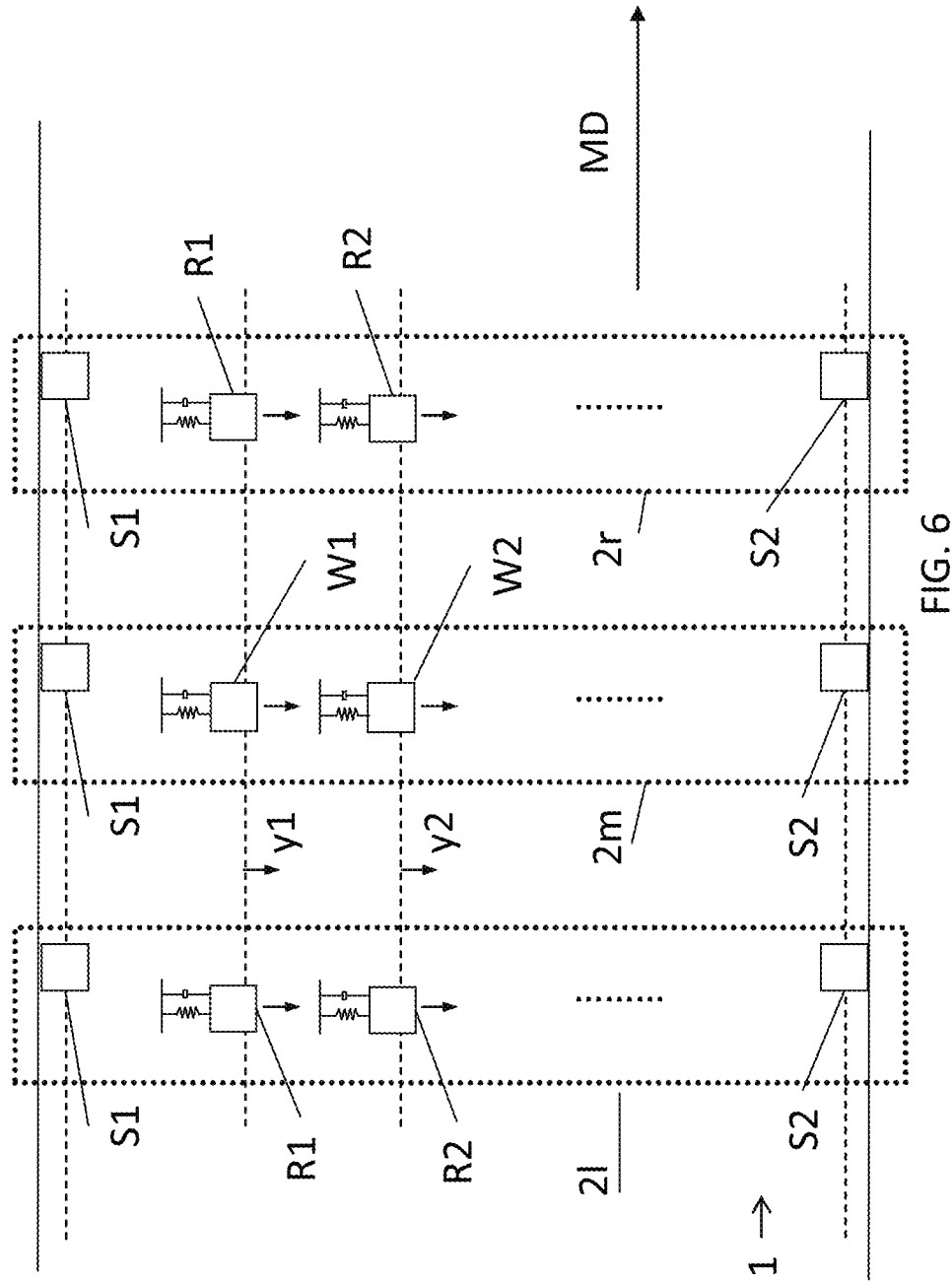

FIG. 6 illustrates another tape head 2 in top view crossed by a tape 1. The tape head of FIG. 6 comprises a left tape head module 2l, a center tape head module 2m and a right hand tape head module 2r. While the left tape head module 2l exclusively comprises read elements R1, R2, . . . , and servo elements S1, S2, the center tape head module 2m exclusively comprises write elements W1, W2, . . . , and servo elements S1, S2, and the right hand tape head module 2r only comprises read elements R1, R2, . . . . Each of the read and write elements of all modules is individually movable and controllable in its transverse position, and therefore is individually mounted to and interconnected with the associated tape head module by means of a suitable actuator. The actuators and spring elements are no longer referred to by reference signs for illustration purposes.

The tape head of FIG. 6 may be operated as follows: Assume that the tape 1 moves across the tape head 2 in moving direction MD as illustrated by the arrow in FIG. 6, the read elements R1, R2 of the left hand tape head module 2l are the ones that are moved in oscillating fashion across the assigned data tracks and adjacent data tracks in order to allow for determining a deviation of the other elements W1 and R1 assigned to the same data track but associated with the other tape head modules 2m and 2r. Hence, whenever a controlled transverse oscillating movement of the read elements R1 of the left hand tape head module 2l provides a signal which indicates that presently the elements assigned to such data track are offset from the track centerline, the read element R1 of the left hand tape head module 2l, the write element W1 of the center tape head module 2m and the element R1 of the right hand tape head module 2r are set to the data track centerline during or after the servo pattern scan mode. In a subsequent user data write mode, user data may be written to the data track by the write element W1 of the center tape head module 2m and immediately may be read by the read element R1 of the right hand tape head module 2r in a read-after-write mode. In a user data read mode, the read element R1 of the right hand tape head module 2r reads user data from the assigned data track. Hence, in the present embodiment and assuming a moving direction of the tape as indicated in FIG. 6, all the read elements R1, R2 of the right hand tape head module 2r would represent the other read element in the context of the claims and typically are responsible for reading user data only, while the read elements R1, R2 . . . of the left hand tape head module 2l are responsible for scanning the servo patterns only and typically do not contribute to the reading of user data from the user data sections. Of course, when the moving direction MD of the tape 1 reverses, the elements of the tape head 2 are controlled such that all the read elements R1, R2 . . . of the left hand tape head module 2l constitute the other read elements in the context of the claims and typically read user data only, while the read elements R1, R2 . . . of the right hand tape head module 2r scan the servo patterns and typically do not contribute to the reading of user data from user data sections.

Figure 7:
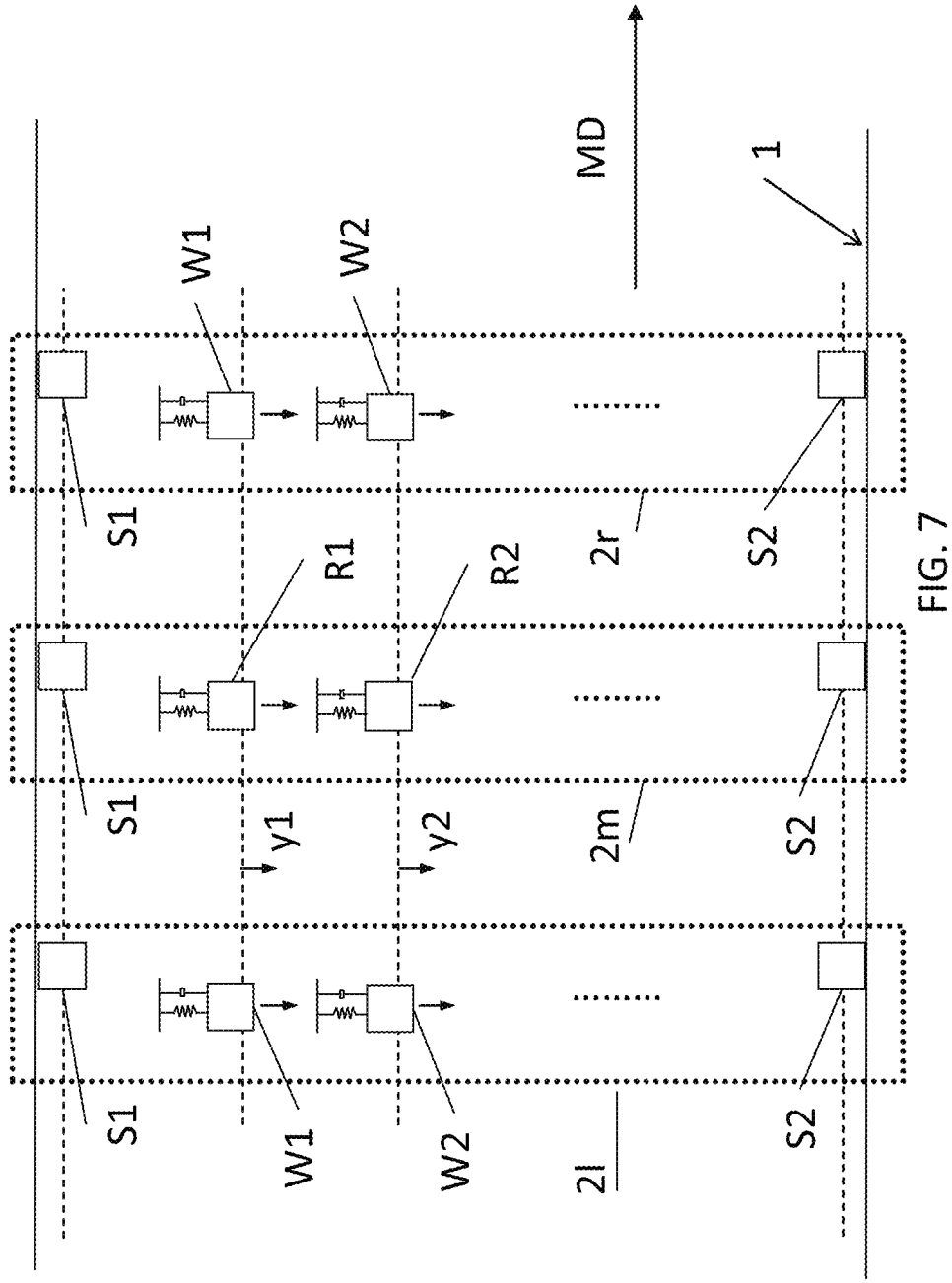

FIG. 7 illustrates another tape head 2 in top view crossed by a tape 1. The tape head of FIG. 7 again comprises a left tape head module 2l, a center tape head module 2m and a right hand tape head module 2r. However, now the left tape head module 2l exclusively comprises write elements W1, W2, . . . , and servo elements S1, S2, the center tape head module 2m exclusively comprises read elements R1, R2, . . . , and servo elements S1, S2, and the right hand tape head module 2r only comprises write elements W1, W2, . . . , and servo elements S1, S2, Each of the read and write elements of all modules is individually movable and controllable in its transverse position, and therefore is individually mounted to and interconnected with the associated tape head module by means of a suitable actuator.

In such configuration, the read elements R1, R2, . . . of the center tape head module 2m have the function of both scanning the servo patterns and reading user data. Hence, in the servo pattern scan mode, the read elements R1, R2, . . . perform lateral movements for identifying edges between adjacent data tracks, while in the user data read/write mode, the read elements R1, R2, . . . remain in a fixed lateral position for reading user data from the data track assigned.

When implementing a read-after-write mode with the present tape head configuration, and assuming a moving direction MD as indicated, user data is written to the tape 1 by means of the write elements W1, W2, . . . of the left hand tape head module 2l, and is read for verification by the read elements R1, R2, . . . of the center tape head module 2m. The write elements W1, W2, . . . of the right hand tape head module 2r may not be operated when the tape is travelling the present moving direction MD. Once the moving direction MD reverses, the write elements W1, W2 . . . of the right hand tape head module 2r write user data to the tape 1 while the write elements W1, W2, . . . of the left hand tape head module 2l are in an idle mode. The read elements R1, R2, . . . of the center tape head module 2m may perform a read-after-write data verification, and, of course, also perform read only operations. It is reminded, that additionally the read elements R1, R2, . . . are used for transverse scanning of the servo patterns integrated into the data tracks.

Figure 4:
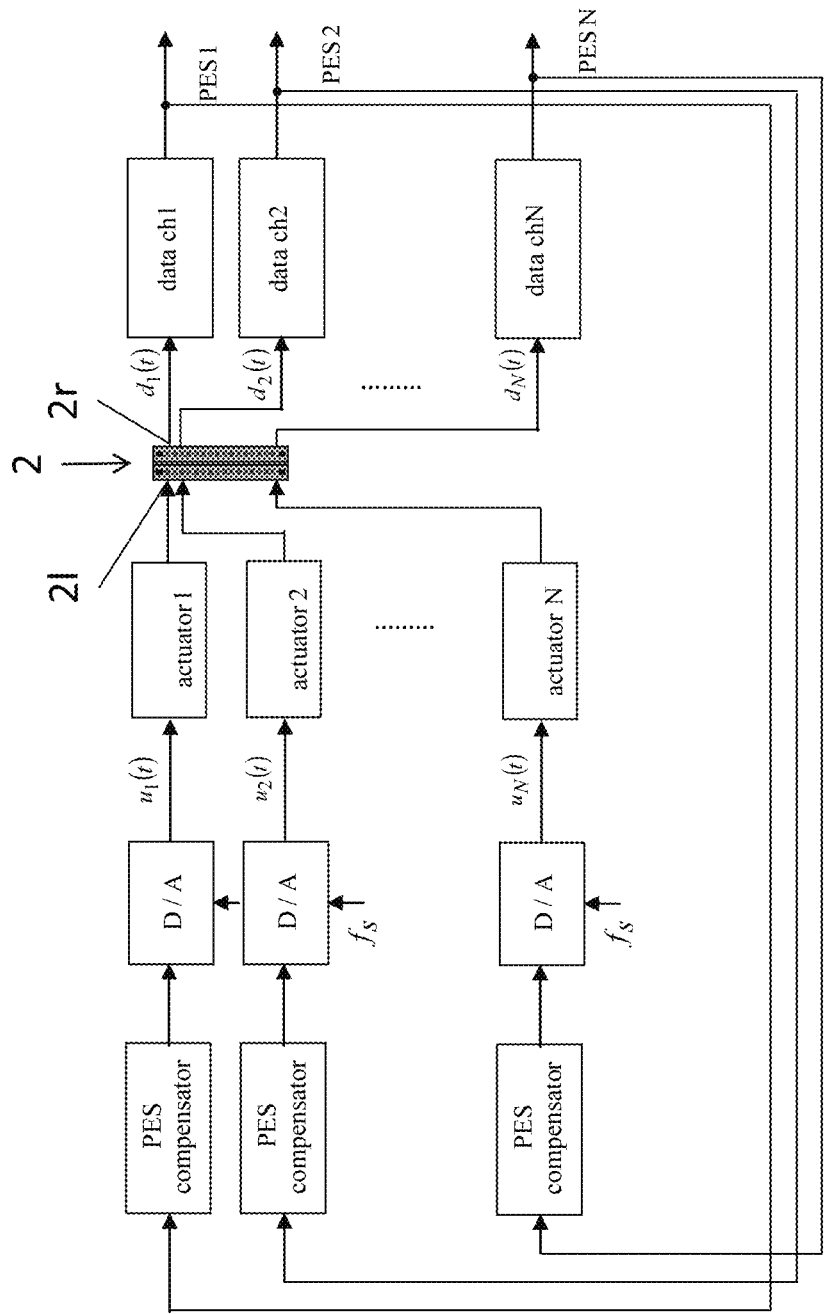
FIG. 4 is a block diagram illustrating a control circuit for all read elements in a tape storage system according to an embodiment of the present invention.

FIG. 4 illustrates a block diagram of a control circuit for all read elements in a tape storage system according to an embodiment of the present invention. A tape head 2 symbolically comprises two tape head modules 2l and 2r, each tape head module 2l and 2r comprising multiple read and write elements. Note that only the actuators for positioning the read/write elements within one head module are explicitly shown for illustration purposes. Read elements of the right hand or left hand tape head module 2r are moved laterally in oscillating fashion and supply signals d1(t), d2(t) . . . during such move, depending on the direction of tape motion. Following building blocks labeled "data ch1", "data ch2", . . . analyze the supplied signals d1(t), d2(t) . . . , and, for each signal d1(t), d2(t) . . . derive a current transverse idle position of the associated read element of the right hand module 2r, and of the write and read elements of the left hand tape head module 2l, for example, by way of analyzing minimum values in the signals d1(t), d2(t) . . . . Such information is supplied in form of a Position Error Signal (PES) to a building block labeled "PES compensator", in which a compensation signal may be determined for realigning the one or more read/write elements from their current position. Such control signal is converted by the following digital/analog D/A converter into an analog control signal u1(t), u2(t), . . . which control signal u1(t), u2(t), . . . is supplied to the actuator of the read and or write elements deviating from the desired position. Such closed-loop control is applied for each read and write element, or may be applied to groups of read and/or write elements.

Figure 9:
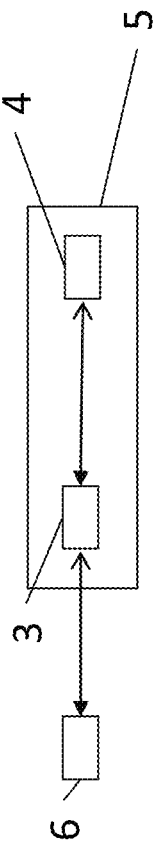
FIG. 9 is a block diagram of a tape storage system according to an embodiment of the present invention.

FIG. 9 illustrates a block diagram of a tape storage system according to an embodiment of the present invention. The tape storage system 5 comprises a controller 3 interacting with a tape drive 4 for operating the tape drive 4 in a way that data can be written and read to/from a tape inserted into the tape drive 4. The tape storage system 5 is connected to a host 6 which host 6 makes use of the tape storage system for archiving data, for example.

FIG. 10 illustrates a flow chart of a method for operating a tape storage system according to an embodiment of the present invention. Step S1 indicates a read element of a tape head reading data from a data track assigned to the read element while the tape is moved across the tape head. In step S2 it is verified if a pre-defined longitudinal position of the tape is reached. If such pre-defined position is reached (Y), which is the indicator that a servo pattern written to the data track starts, the read element is started to oscillate transverse to the moving direction of the tape in step S3. In step S4, it is verified if another pre-defined longitudinal position of the tape has been reached, which other pre-defined position shall indicate the end of the servo pattern written to the data track. If the other pre-defined position is reached (Y), the read element stops oscillating, a signal supplied by the read element during scanning the servo pattern is evaluated, a deviation of the lateral position of the read element from the track centerline is determined, and a control signal is issued to an actuator for positioning the read element and an associated write element to the track centerline, all in step S5. Then, the read element again starts reading user data from the data track.

As will be appreciated by one skilled in the art, aspects of the present invention may be embodied as a system, method or computer program product. Accordingly, aspects of the present invention, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as operating, read and/or write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for operating a tape storage system, the method comprising:
   while a tape is being moved in a tape drive across a tape head for one or more of reading and writing user data from/to a data track of the tape, determining a transverse deviation of a read element of the tape head from a track center line of the data track by, once the read element is moved across a servo pattern included within the data track, intentionally oscillating the read element in a direction transverse to a moving direction of the tape for a distance of not less than a width of the data track, such that the read element is intentionally moved from the data track to a first adjacent data track on one side of the data track and to a second adjacent data track on another side of the data track; and
   controlling a transverse position of one or more of the following elements subject to a signal supplied by the read element during its transverse move:
   the read element, which is assigned to the data track;
   another read element assigned to the data track; and
   a write element assigned to the data track.

2. The method according to claim 1, wherein the read element is moved during a first period in time, and wherein the transverse position of the one or more elements is controlled at the end or after the first period in time subject to the signal supplied by the read element during the first period in time.

3. The method according to claim 1, wherein controlling the transverse position of the one or more elements includes positioning the subject element on the track center line of the assigned data track.

4. The method according to claim 1, wherein the servo pattern is followed on the data track by a user data section containing or reserved to contain user data.

5. The method according to claim 4, wherein in a servo pattern scan mode the read element is moved for scanning the servo pattern, wherein in a user data read/write mode the user data section is read or written respectively by means of the one or more elements, and wherein the servo pattern scan mode and the user data read/write mode alternate during moving the tape across the tape head.

6. The method according to claim 5, wherein the one or more elements are positioned on the track center line of the assigned data track.

7. The method according to claim 4, wherein the tape is preformatted with the servo pattern prior to the tape being used for reading or writing data from/to.

8. The method according to claim 7, wherein the servo pattern is represented by data items including data items in synchronization fields of the tape.

9. The method according to claim 4, wherein the servo pattern is written by the write element in combination with writing user data to the tape.

10. The method according to claim 4, wherein the read element is moved for scanning the servo pattern of the assigned data track and for at least partially scanning a servo pattern of one or both of adjacent data tracks.

11. The method according to claim 10, wherein the servo pattern of the one or both adjacent data tracks is phase shifted with respect to the servo pattern of the assigned data track.

12. The method according to claim 10, wherein the servo pattern of the assigned data track comprises servo sub-patterns which repeat in the servo pattern in longitudinal direction at a first frequency, and wherein the servo patterns of the one or both adjacent data tracks comprises the same servo data sub-patterns which repeat in said adjacent data track at a second frequency being different from the first frequency.

13. The method according to claim 1, wherein the read element is moved transverse to the moving direction of the tape for a distance of twice the width of the data track.

14. The method according to claim 1, wherein the read element is oscillating transverse to the moving direction of the tape.

15. The method according to claim 4, wherein the read element starts moving in response to identifying a longitudinal position on the tape which longitudinal position on the tape indicates a beginning of the servo pattern.

16. A computer program product comprising a non-transitory computer readable storage medium having computer readable program code embodied therewith, the computer readable program code comprising computer readable program code configured to perform a method comprising:
   while a tape is being moved in a tape drive across a tape head for one or more of reading and writing user data from/to a data track of the tape, and once the read element is moved across a servo pattern included within the data track, intentionally oscillating a read element of the tape head in a direction transverse to a moving direction of the tape for a distance of not less than a width of the data track, such that the read element is intentionally moved from the data track to a first adjacent data track on one side of the data track and to a second adjacent data track on another side of the data track, in order to determine a transverse deviation of the read element from a track center line of the data track; and
   controlling a transverse position of one or more of the following elements subject to a signal supplied by the read element during the transverse movement of the read element:

the read element, which is assigned to the data track;
another read element assigned to the data track; and
a write element assigned to the data track.

17. A tape storage system, comprising:
a tape head;
a tape drive configured to move a tape inserted into the tape drive across the tape head;
the tape head comprising a read element movably mounted to take different positions transverse to a moving direction of the tape; and
a controller adapted to once the read element is moved across a servo pattern included within a data track, intentionally oscillate the read element in a direction transverse to the moving direction of the tape for a distance of not less than a width of the data track assigned to the read element, such that the read element is intentionally moved from the data track to a first adjacent data track on one side of the data track and to a second adjacent data track on another side of the data track, in order to determine a transverse deviation of the read element from a track center line of the data track, the controller further configured to generate a control signal for controlling a transverse position of one or more of:
the read element;
another read element assigned to the data track; and
a write element assigned to the data track, subject to a signal supplied by the read element during its transverse move.

18. The tape storage system according to claim 17, wherein the one or more elements are movably mounted at a frame of the tape head to take different transverse positions with respect to the frame.

19. The tape storage system according to claim 17, wherein the tape head comprises a set of read elements assigned to different data tracks, and wherein the tape head comprises an assembly containing a subset out of set of read elements which read elements of the subset of read elements are mechanically linked, and wherein the assembly is movably mounted to take different positions transverse to a moving direction of the tape.

* * * * *